US012553266B2

(12) United States Patent
Paskonis

(10) Patent No.: US 12,553,266 B2
(45) Date of Patent: Feb. 17, 2026

(54) HIGH STRENGTH DOOR STRIKER AND METHOD FOR MAKING

(71) Applicant: AMANDA MANUFACTURING, LLC, Livonia, MI (US)

(72) Inventor: Almantas K. Paskonis, Concord Township, OH (US)

(73) Assignee: AMANDA MANUFACTURING, LLC, Livonia, MI (US)

( * ) Notice: Subject to any disclaimer, the term of this patent is extended or adjusted under 35 U.S.C. 154(b) by 13 days.

(21) Appl. No.: 18/796,735

(22) Filed: Aug. 7, 2024

(65) Prior Publication Data

US 2024/0392615 A1 Nov. 28, 2024

Related U.S. Application Data

(63) Continuation of application No. 16/819,800, filed on Mar. 16, 2020, now Pat. No. 12,060,737.

(60) Provisional application No. 62/822,132, filed on Mar. 22, 2019.

(51) Int. Cl.
*E05B 85/04* (2014.01)
*E05B 15/02* (2006.01)

(52) U.S. Cl.
CPC .......... *E05B 85/04* (2013.01); *E05B 15/0205* (2013.01); *E05B 2015/023* (2013.01)

(58) Field of Classification Search
CPC ................. E05B 15/02; E05B 15/0205; E05B 2015/023; E05B 85/04; E05B 85/045; Y10T 292/68; Y10T 292/683; Y10S 292/64
See application file for complete search history.

(56) References Cited

U.S. PATENT DOCUMENTS

| | | | | |
|---|---|---|---|---|
| 4,391,121 A | | 7/1983 | Taruntaev | |
| 4,466,645 A | | 8/1984 | Kobayashi | |
| 4,981,313 A | | 1/1991 | Makamura | |
| 5,050,917 A | | 9/1991 | Hamada et al. | |
| 6,095,576 A | * | 8/2000 | Burton | E05B 85/045 292/340 |
| 6,883,842 B2 | * | 4/2005 | Paskonis | E05B 85/045 292/DIG. 64 |

(Continued)

FOREIGN PATENT DOCUMENTS

| | | | | |
|---|---|---|---|---|
| DE | 102014011137 A1 * | 7/2015 | E05B 85/243 |
| JP | H08199870 A | 8/1996 | |

(Continued)

OTHER PUBLICATIONS

International Search Report and Written Opinion for PCT/US2020/022942 dated Jun. 19, 2020, 13 pages.

*Primary Examiner* — Kristina R Fulton
*Assistant Examiner* — Noah Horowitz
(74) *Attorney, Agent, or Firm* — Taft Stettinius & Hollister LLP

(57) ABSTRACT

The present disclosure provides a door striker assembly having an improved interface between a striker pin and a base plate. The striker pin comprising a raised section wherein a cross-section of the raised section comprises a bottom taper and a top taper where the bottom taper is inserted into a base plate aperture from a top side of the base plate for seating the striker pin into the base plate aperture. The present disclosure also provides a method for forming the aforementioned door striker assembly.

20 Claims, 8 Drawing Sheets

(56) References Cited

U.S. PATENT DOCUMENTS

| | | | | |
|---|---|---|---|---|
| 9,091,101 | B2 * | 7/2015 | Paskonis | E05B 83/16 |
| 9,316,021 | B2 | 4/2016 | Burciaga et al. | |
| 9,499,070 | B2 * | 11/2016 | Fujii | E05B 85/04 |
| 9,957,738 | B2 * | 5/2018 | Muramatsu | E05B 81/18 |
| 10,407,964 | B2 | 9/2019 | Abbott et al. | |
| 2006/0055179 | A1 * | 3/2006 | Burton | E05B 83/24 292/216 |
| 2007/0001468 | A1 | 1/2007 | Burton | |
| 2007/0075552 | A1 | 4/2007 | Hayakawa et al. | |
| 2007/0262595 | A1 | 11/2007 | Johnson | |
| 2009/0079208 | A1 * | 3/2009 | Mizuno | E05B 77/40 29/530 |
| 2019/0264472 | A1 | 8/2019 | Bejune et al. | |
| 2020/0040622 | A1 | 2/2020 | Digel | |
| 2021/0246687 | A1 * | 8/2021 | Digel | B62D 25/12 |

FOREIGN PATENT DOCUMENTS

| | | | | |
|---|---|---|---|---|
| JP | 2002201830 | A * | 7/2002 | E05B 85/045 |
| KR | 101404252 | B1 * | 6/2014 | E05B 83/18 |
| KR | 20160102781 | A | 8/2016 | |
| WO | 2015098206 | A1 | 7/2015 | |
| WO | 2017211348 | A1 | 12/2017 | |

* cited by examiner

HIGH STRENGTH DOOR STRIKER AND METHOD FOR MAKING

This patent application is a continuation of U.S. Patent Application Ser. No. 16/819,800, which claims priority to and benefit of U.S. Provisional Application No. 62/822,132, filed Mar. 22, 2019, each of which is incorporated herein by reference.

BACKGROUND

Field

This application relates generally to door strikers, door striker assemblies for automobiles, and methods for making the same.

Description of Related Art

Door strikers are provided on automobiles, or vehicles, to releasably secure a door to the vehicle. Generally, a mounting plate, or base plate, is affixed to a doorjamb with a striker pin extending therefrom. A latch, affixed to the door, is releasably secured to the striker pin.

FIGS. 1-3 illustrate a prior art example of a door striker 50. FIG. 1 is cross-section of a prior art door striker having a striker pin 10 connected to a base plate 20. The end 12 of the striker pin 10 is positioned through an opening 22 of the base plate 20. To secure the striker pin 10 to the base plate 20, a button 14 is formed on the end 12 of the striker pin 10 for anchoring the striker pin 10 to a bottom side 24 of the base plate 20. This is done to prevent the striker pin 10 from being pulled out of the base plate 20. In the prior art example, a collar 16 is formed on the striker pin to a top side 26 of the base plate. This is done to prevent the striker pin 10 from being pushed through the base plate 20. In prior processes the collar is formed by heading, which may be done by either cold working or hot working. In this prior art example, clearance, within the opening of the base plate, is provided between the striker pin 10 and the base plate 20 to allow for ease of joining the two components. It is desired to have this clearance filled when staking the striker pin 10 during the button forming process. However, the striker pin 10 may only situationally or partially bulge the wire of the striker pin and does not completely fill the clearance between the striker pin 10 and the base plate 20. As a result the striker pin is not rigidly secured within the base plate and the striker pin fails at a stress zone as further described below.

Turning to FIG. 2, a front view of the prior art example of the striker pin 10 is illustrated. As illustrated here, small radii 18 are formed on the collar 16. The small radii 18 and the method for forming the small radii 18 create stress zones, or weaknesses, within the steel structure. Specifically, the small radii 18 are formed when forming the collar 16 by heading wherein the collar 16 conforms to the shape of the base plate at the top surface of the base plate. FIG. 3 is a partial view of a striker pin 10 at a collar 16 and illustrates the material grain pattern 30 and grain deformation in the drawn wire of a wire form used for a striker pin. The grain deformation illustration is representative of stress risers 40, or areas susceptible to failure when loads are applied at oblique angles. The stress risers 40 are the abrupt transitions in the grain paths formed at the collar 16. The prior art door striker may provide for a strong joint between the striker pin and the base plate when a force is applied perpendicular to the base plate. However, the strength of the prior art door striker is greatly reduced at the stress risers and, thereby, the prior art door striker fails when a load is applied to the top of the striker pin with forces being applied at angles oblique to the base plate. Specifically, when the striker pin begins to bend under forces applied at an angle oblique to the base plate the striker pin may move within the unfilled clearances of the base plate and/or fail at a stress zone. As illustrated by the grain deformations, the prior art collar creates these points of failure. In view of this, what is desired is a high strength striker pin made to reduce the stress zones and to withstand loads applied at angles oblique to the base plate.

BRIEF SUMMARY

Disclosed is a high strength door striker and a method for making the same. The door striker comprises a striker pin and a base plate. The manner in which the striker pin is secured to the base plate increases the strength properties of the door striker as will be illustrated in comparative examples in the detailed description. More specifically, the presently disclosed door striker withstands more than twice the loads of a prior art door striker, made of the same material and of the same size and prevents failure of the striker pin with loads applied at oblique angles.

Examples of the presently disclosed high strength door striker strengthens the striker assembly by eliminating the collar construction of the prior art door striker. Specifically, the present disclosure sets out to reduce grain deformation by eliminating the collar of the prior art door striker. In one example, the collar is replaced with a raised section having at least one taper, with a reduced grain deformation. In some examples, the taper is mated with an aperture in the base plate such that the taper deforms the aperture of the base plate and becomes seated, or mated, within the aperture of the base plate. This is accomplished by providing a striker pin having a greater hardness than the base plate, as measured by the Rockwell hardness test. The striker pin becomes seated by forcefully pressing, or driving, the taper of the raised section into the aperture of the base plate from a top side of the base plate. Once the striker pin is seated, or mated, within the base plate, a button may be formed at an end of the striker pin, such as a terminal end, extending through the aperture of the base plate. The button is secured to the bottom side of the base plate. Upon securing the striker pin to the bottom side of the base plate, the base plate is positioned and locked between the raised section and the end of the striker pin.

In one example of a door striker of the present disclosure, the door striker comprises a striker pin having a first end, a second end, and a central section between the first end and the second end. The door striker further comprises a base plate having one or more apertures extending through a thickness of the base plate. The first end and the second end each extend through a respective aperture of the one or more apertures in the base plate. The striker pin comprises a first raised section between the first end and the central section and a second raised section between the second end and the central section. Each raised section comprises a bottom taper and a top taper and the bottom taper is inserted into the respective aperture from a top side of the base plate. The striker pin further comprises a button formed on each respective end of the striker pin to mate with the bottom side of the base plate and to secure the base plate between each striker pin button and the respective raised section.

In one example of a method for forming a door striker, the method comprises:

(a) inserting an end of a striker pin into an aperture in a base plate where the striker pin extends through the aperture in the base plate from a top side of the base plate to a bottom side of the base plate wherein a raised section of the striker pin comprises a bottom side taper such that the bottom side taper mates with the base plate within the aperture from the top side of the base plate; and (b) forming a button on the end of the striker pin at the bottom side of the base plate wherein the base plate is secured between the raised section and the button.

The method for forming a door striker may further comprise:

(c) pressing the raised section into the aperture from the top side of the base plate wherein the bottom side taper deforms the aperture and is recessed into the aperture; and (d) wherein forming the button on the terminal end of the striker pin occurs after pressing the raised section into the aperture.

These and other examples are described in more detail below.

BRIEF DESCRIPTION OF THE DRAWING

Various non-limiting examples are further described with reference to the accompanying drawings in which.

DETAILED DESCRIPTION

Figure 1:
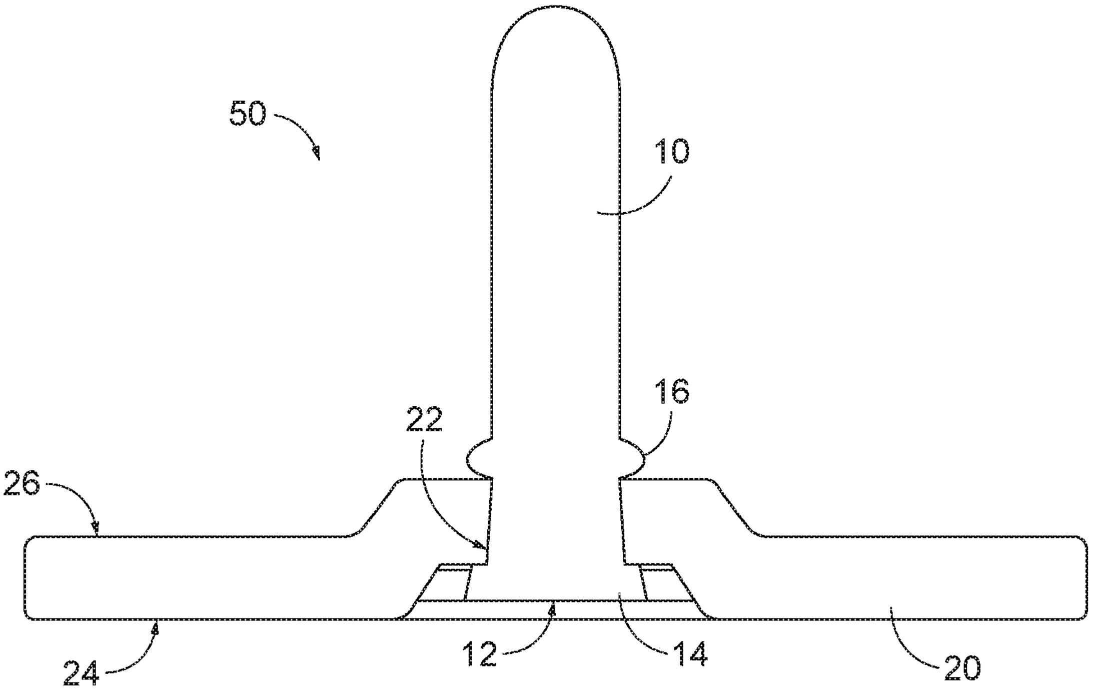
FIG. 1 (Prior Art)
FIG. 1 is a cross-sectional view of a prior art example of a door striker.
Figure 2:
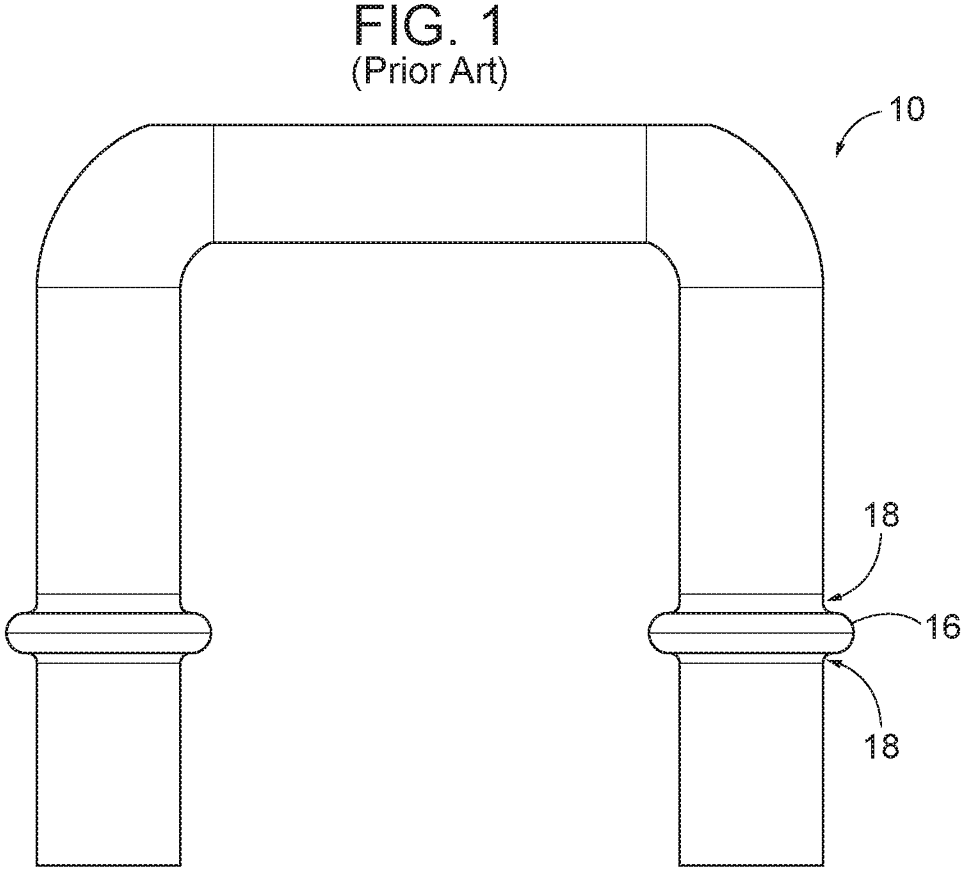
FIG. 2 (Prior Art)
FIG. 2 is a front view of a prior art example of a striker pin for a door striker.
Figure 3:
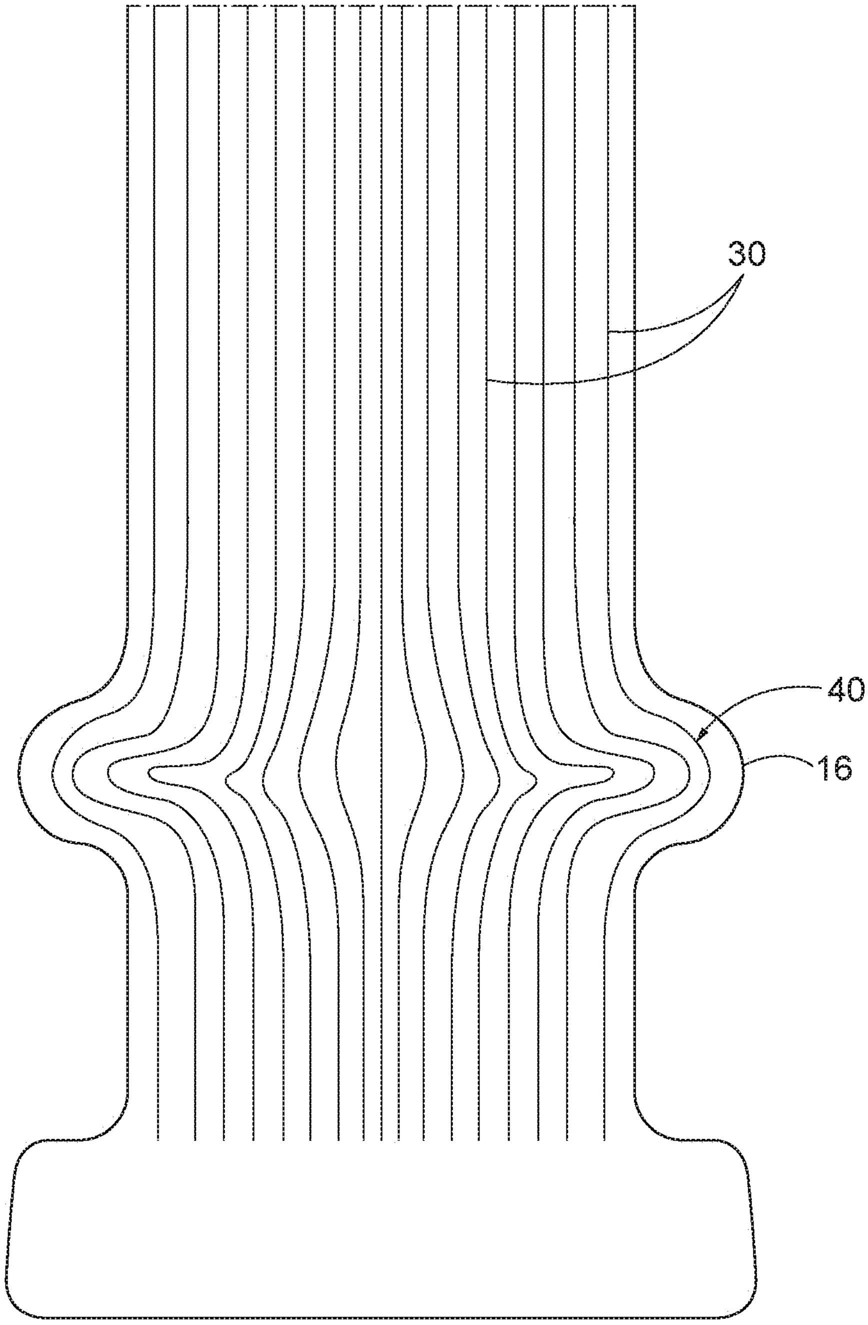
FIG. 3 (Prior Art)
FIG. 3 is an enlarged sectional view of a prior art example of the grain deformation of a striker pin for a door striker.
Figure 4:
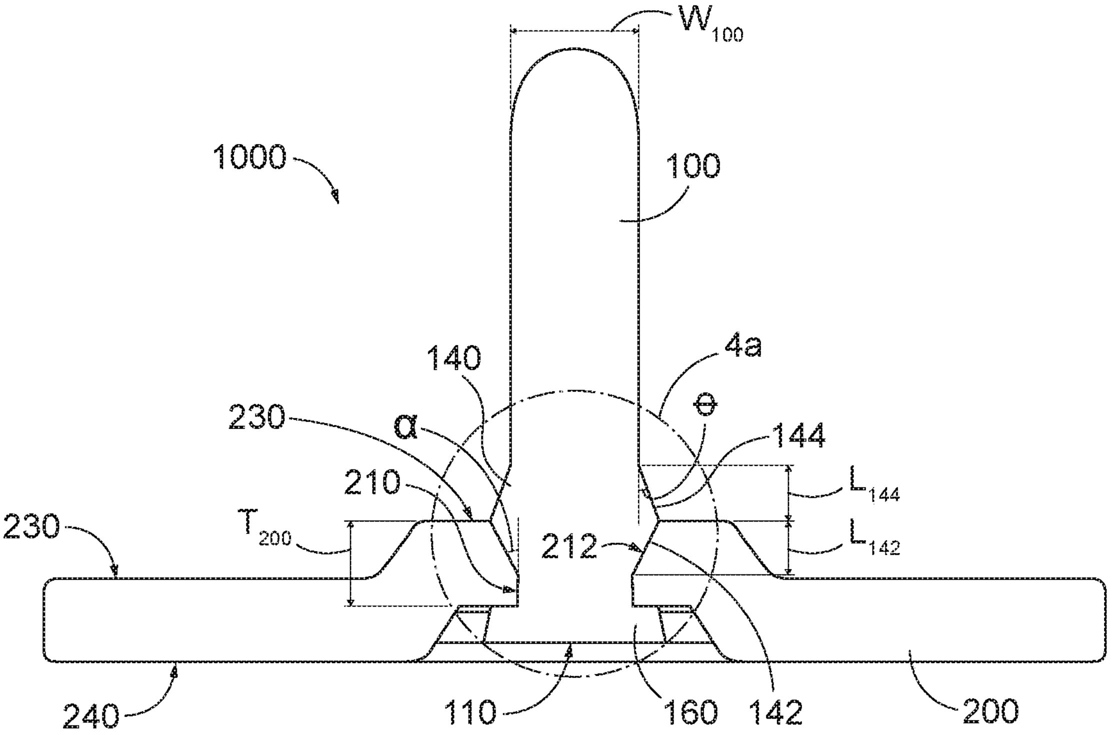
FIG. 4 is a cross-sectional view of an exemplary, non-limiting example of a door striker according to one or more aspects of the present disclosure.
Figure 5:
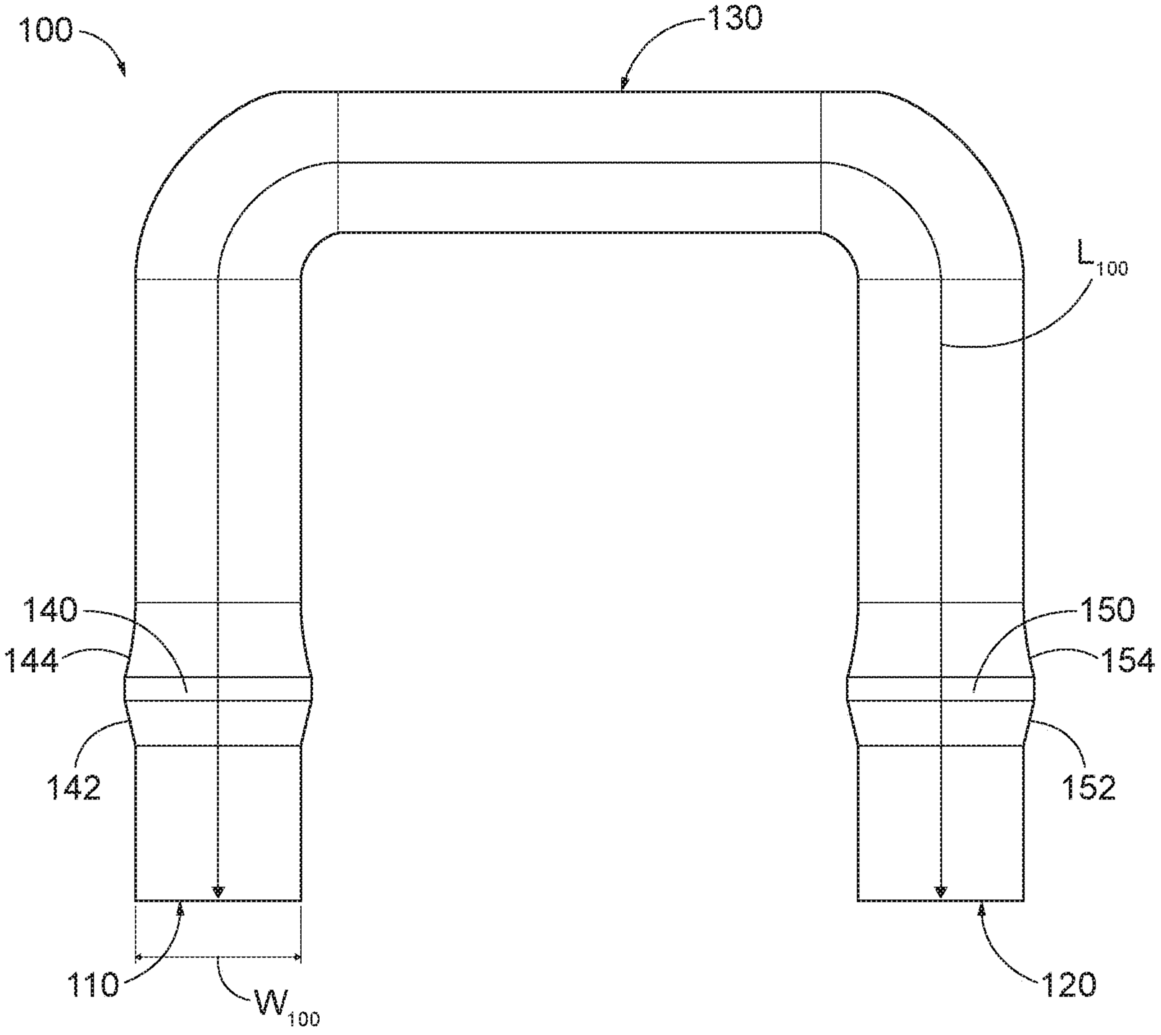
FIG. 5 is a front view of an exemplary, non-limiting example of a striker pin for a door striker according to one or more aspects of the present disclosure.

An example a door striker 1000 of the present disclosure is shown in FIG. 4 as a cross-section of the door striker. An example of a front view of a striker pin 100 of the present disclosure is shown in FIG. 5. In FIGS. 4-5, a striker pin 100 having a first end 110, a second end 120, and a central section 130, between the first end 110 and the second end 120, is illustrated. As illustrated by FIG. 4 with respect to the first end, the first end 110 and the second end 120 of the striker pin 100 each extend through a respective aperture 210 in a base plate 200. The apertures 210 extend from a top side 230 of the base plate 200 through the material thickness of the base plate $T_{200}$ in a direction of a bottom side 240 of the base plate 200. As illustrated by FIG. 5, the striker pin 100 includes a first raised section 140 and a second raised section 150. The raised sections 140, 150 further comprise tapered sections having a bottom taper 142, 152 for forming and mating with a respective aperture 210 at a top side 230 of the base plate 200, as illustrated by FIG. 4. The raised section 140, 150 may also comprise top taper 144, 154, opposite the bottom taper relative the length of striker pin $L_{100}$. The raised sections 140, 150 form the seat within a respective aperture of the base plate and prevent the striker pin 100 from being pulled through each respective aperture in the base plate.

As illustrated by FIG. 5, the raised sections 140, 150 are located between the central section 130 and the respective first or second end 110, 120. The raised sections 140, 150 further comprise the tapered sections. Specifically, the bottom taper 142, 152 is provided to mate with a respective aperture at the top side of the base plate. The top taper 144, 154 is positioned opposite the bottom taper, relative the length of striker pin $L_{100}$. Turning to FIG. 4, the top taper 144 transitions the raised section back to the cross-sectional width $W_{100}$ of the striker pin 100. In one example, where the striker pin 100 is a round wire form, the tapers enlarge the diameter of the striker pin 100 for a short distance. The tapers are provided at the location where the striker pin 100 is to engage the top side 230 of the base plate 200. In some examples, the striker pin 100 will maintain an area of clearance, or a void, between the pin and the perimeter of the aperture for ease of assembly. By example, such a clearance is created when the outside diameter of a round striker pin is less than the inside diameter of the aperture in the base plate. However, the bottom taper of the present disclosure will centrally and consistently set, and/or seat, the striker pin 100 into the aperture, as further described below.

Figure 6:
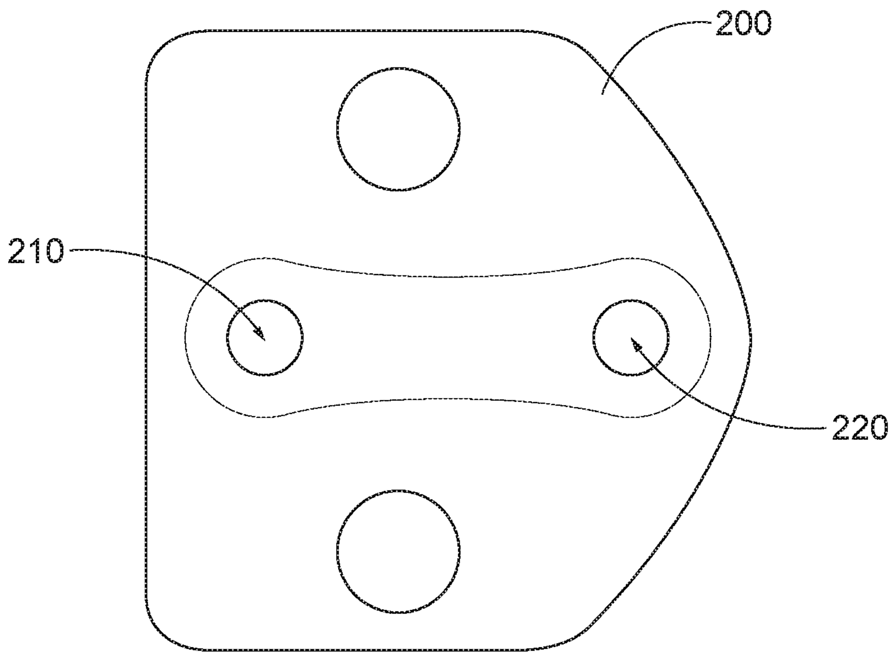
FIG. 6 is a top view of an exemplary, non-limiting example of a base plate for a door striker according to one or more aspects of the present disclosure.
Figure 7:
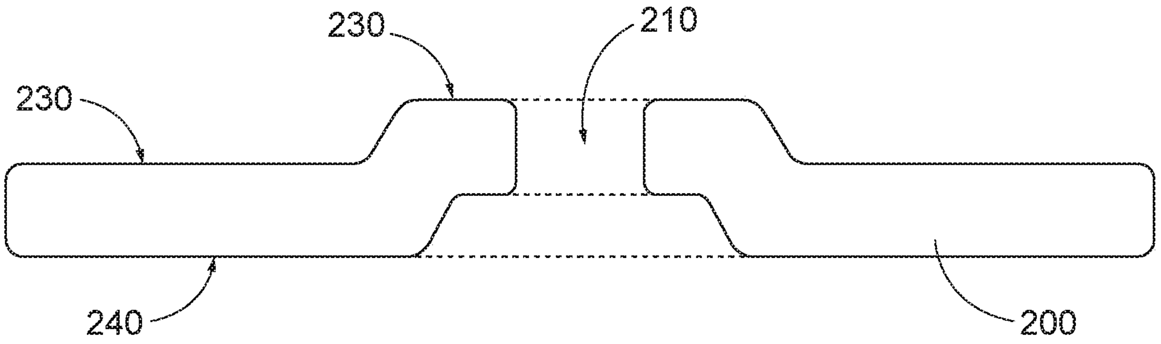
FIG. 7 is a cross-sectional view of an exemplary, non-limiting example of a base plate for a door striker prior to insertion of a striker pin according to one or more aspects of the present disclosure.

FIGS. 6-7 illustrate an example of a base plate 200 of the present disclosure. Specifically, FIG. 6 is a top side view of the base plate 200 having two apertures 210, 220. Each aperture is for receiving a respective end, such as a first or second end of the striker pin. FIG. 7 is a cross-sectional view bisecting an aperture 210 of the base plate 200, the base plate 200 having a top side 230 and a bottom side 240.

Figure 4A:
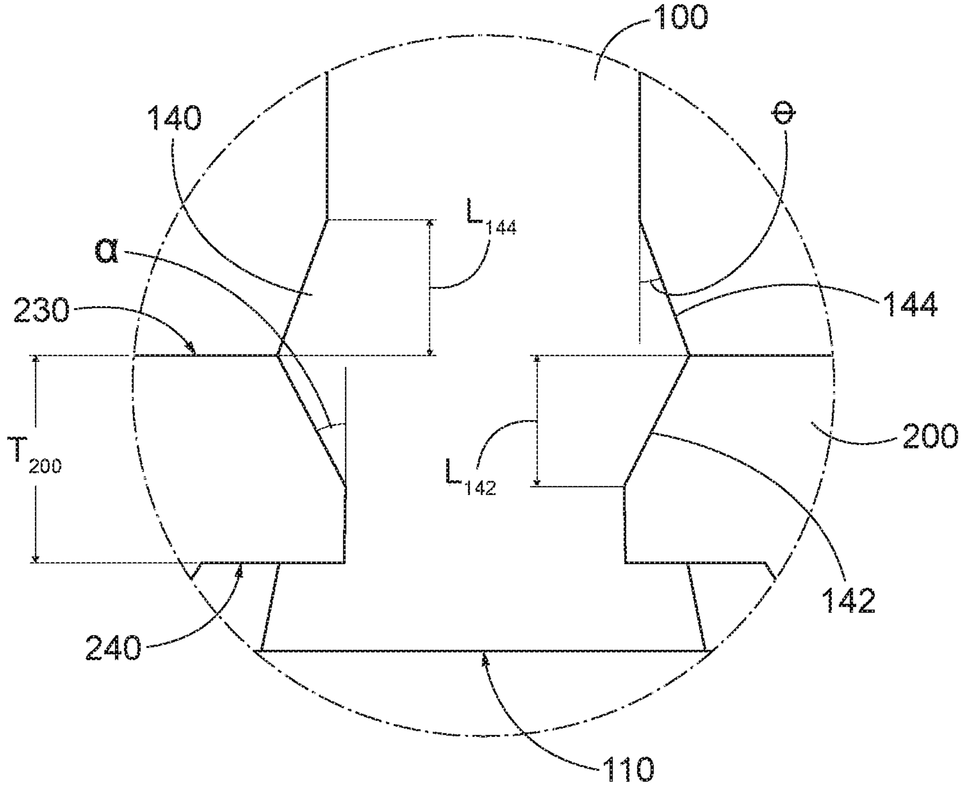
FIG. 4*a* in an enlarged view of section 4*a* of FIG. 4.

Turning to FIG. 4, upon being pressed into the aperture the respective aperture 210 deforms, or conforms, to the bottom taper 142, 152 of the raised section 140, 150. In other words, the edge of the bore of the aperture in the base plate is deformed by the bottom taper. Specifically, the bottom taper forms a seat in the aperture of the base plate at the top side of the base plate. Upon being formed, the seat formed in the aperture secures the bottom taper 142, 152 within the aperture in a mated arrangement between the bottom side taper 142, 152 and the respective aperture seat. Simply stated, the bottom taper 142, 152 is seated into, or mated with, the respective aperture 210 from the top side 230 of the base plate 200. The bottom taper 142, 152 mates with at least one sidewall 212 of the aperture 210. Upon being pressed, the sidewalls 212 are an inverse representation of the bottom taper 142. FIG. 4*a* illustrates an enlarged view of this arrangement.

Still referring to FIG. 4, the first end 110 extends through a respective aperture 210 at the bottom side 240 of the base plate 200. To lock, or secure, the striker pin 100 to the base plate, a respective button 160 may be formed at the first end 110 of the striker pin 100. The button 160 may be formed on the end, such as a terminal end, of the striker plate by heading, orbital forming, cold working, hot working, or the like. FIG. 4*a* is an enlarged view of section 4*a* of FIG. 4 for features described with respect to FIG. 4.

In one example, as illustrated by the striker pin 100 of FIG. 5, the striker pin 100 is U-shaped. However, it is appreciated additional configurations or shapes are contemplated herein. By example, a striker pin may be a V-shape, an L-shape, an arch, an open trapezoid, open polygon, or the like. In one example, the striker pin is a wire form, such as drawn wire. A wire form is termed as a wire having a horizontal bridge, or a central section as identified above.

Figure 8:
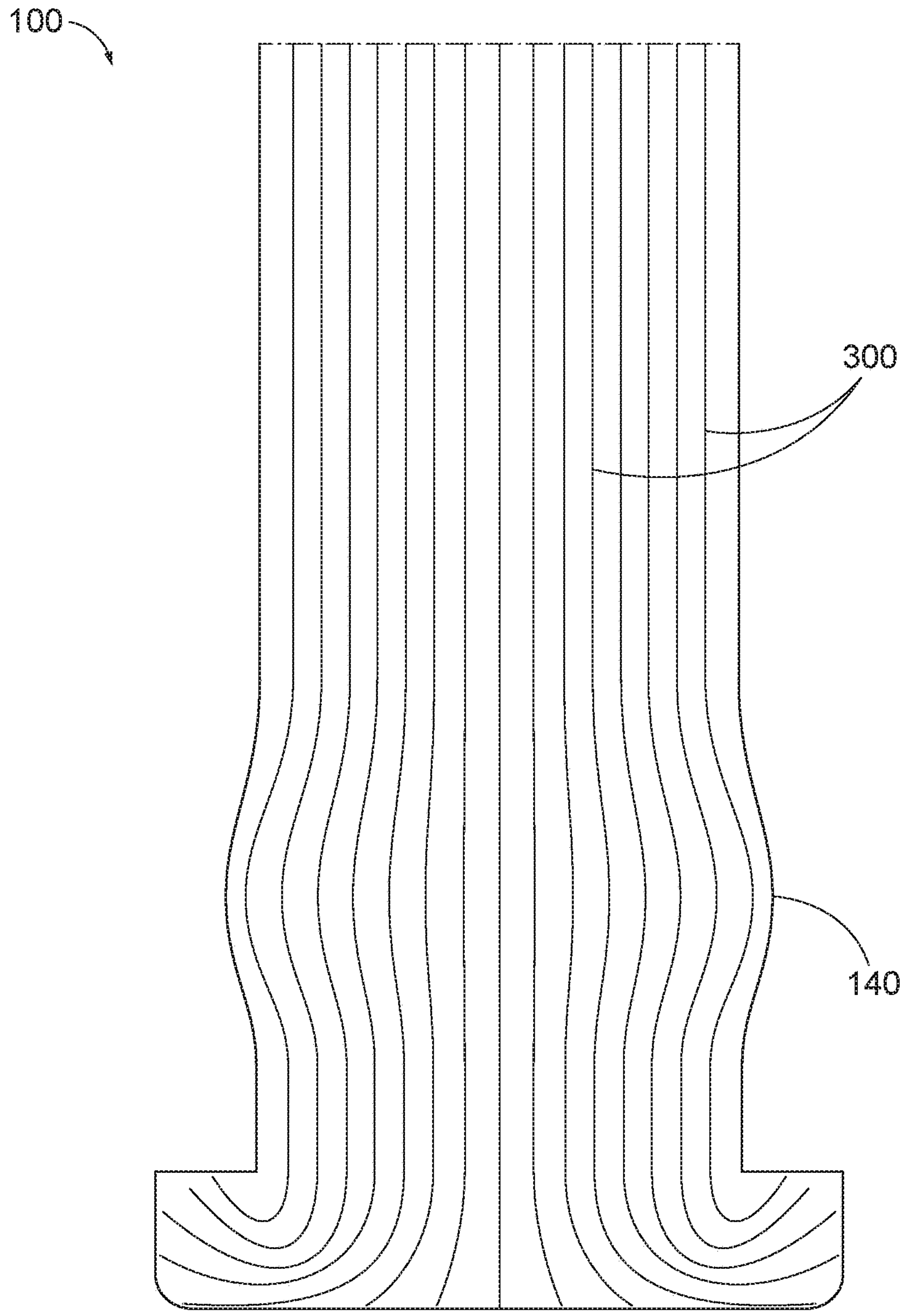
FIG. 8 is an enlarged sectional view of an exemplary, non-limiting example of the grain deformation of a striker pin for a door striker according to one or more aspects of the present disclosure.

The present disclosure sets out to reduce the grain deformation of the striker pin material, thereby, decreasing stress locations susceptible to failure. By example, FIG. 8 is partial view of one end of a striker pin 100 of the present disclosure and illustrates the material grain pattern 300 and the grain deformation of the raised section 140. In particular, the grain deformation is greatly reduced through the transition, or tapers, of the raised section. Specifically, the deformation is reduced in comparison to the collar of prior art examples described above. Reduced grain deformation is accomplished by reducing the dimensional change of the material at the raised sections. Additionally, this is accomplished by providing a much more moderate transition, such as a taper, at the location of the dimensional change. Moreover, this is also accomplished by providing a more controlled mechanism for forming the dimensional change of the material. In particular, the raised sections may be formed prior to installation in and independent of the base plate. Each of these improvements over the prior art are further described and structurally defined below.

As indicated above, the strength of the door striker of the present disclosure is increased by reducing the dimensional change of the material at the raised sections. In specific examples, the cross-section of a striker pin may be increased by no more than 20 percent at each raised section. By example, the diameter of striker pin, such as a round wire of a wire form, would be increased by no more than 20 percent. In another specific example, the cross-section of a striker pin may be increased 15 percent to 20 percent at each raised section. It must also be appreciated that in some examples, the cross-section of the striker pin may be increased by at least 15 percent at each raised section. It is appreciated herein that the striker pin may be a wire with a round cross-section, thereby, comprising a diameter. Alternatively, it is also appreciated the cross-section of the striker pin may be of any geometric shape or a combination of geometric shapes. The cross-section, as described herein, is descriptive of these alternative shapes just as a cross-section for a round wire is descriptive of the diameter of the round wire.

The raised section may, additionally or alternatively, be described relative to the grain deformation of the striker pin. In specific examples, the grain deformation of the striker pin, at the raised section, may comprise gradients of 45 degrees or less. It is appreciated that grain deformations may not be linear and, therefore, a gradient is relied on to define the grain deformation having multiple vectors. However, in the instance the grain deformation is linear, some examples may be described as having a grain deformation of the striker pin, at the raised section, comprising vectors of 45 degrees or less. In yet another example, the grain deformation of the striker pin, at the raised section, may consist of gradients of 45 degrees or less and/or may consist of vectors of 45 degrees or less. Another specific example may have grain deformation of the striker pin, at the raised section of a striker pin, comprising gradients of 30 degrees or less and/or may comprise vectors of 30 degrees or less. In another example, the striker pin may consist of gradients of 30 degrees or less and/or may consist of vectors of 30 degrees or less. Still yet, in another example, a striker pin may have grain deformation, at the raised section, comprising gradients of 15 degrees or less and/or comprising vectors of 15 degrees or less. In still another example, the striker pin may consist of gradients of 15 degrees or less and/or may consist of vectors of 30 degrees or less.

As also described above, the strength of the door striker of the present disclosure is increased by providing a moderate transition, such as a taper, at the location of the dimensional change. This is in comparison to a sharp radius of the prior art collar. In an example, the bottom side taper of a raised section may increase at an angle of 15 degrees or less. In another example, the bottom side taper of the raised section may increase at an angle of 14 degrees or less. In still yet another example, the bottom side taper of the raised section may increase at an angle of 14 degrees to 15 degrees. The angle of increase for the bottom side taper is identified as $\alpha$ in FIGS. 4-4*a*. An angle of increase for the top side taper is identified as $\theta$ in FIGS. 4-4*a*.

As further described above, the strength of the door striker of the present disclosure is increased by providing a more controlled mechanism for forming the dimensional change of the material by forming the raised sections prior to installation in and independent of the base plate. In the prior art, the collar is headed and pressed into the base plate wherein the collar conforms to the shape of the base plate. As a result, the sharp corners or radii, representative of the edge of a bore in a base plate, are formed on the collar. In contrast, the present disclosure sets out to form the raised section independent of the base plate. This provides for a more controlled environment. The raised section may be formed by heading in a captive die such that only a mild distortion of the grain occurs in the striker pin. Once formed, the raised section is then seated into, or mated with, the base plate where deformation of the base plate occurs. This is in contrast to a base plate causing deformation of the striker pin to form a collar or providing a collar having stress risers as illustrated by the prior art example. This may be accomplished by providing a base plate with a hardness less than the hardness of the raised section and/or striker pin, as measured by the Rockwell hardness test. Further, by deforming the base plate, the bottom taper of the raised section becomes seated into, or mated with, the base plate, thereby, providing a continuous, consistent, and/or even engagement between striker pin and the base plate. By seating, or mating, the raised section into the base plate the strength of the connection between the base plate and the striker pin is further increased. In specific examples, the length of the bottom taper is equal to or more than 75 percent of the material thickness of the base plate. In yet another example, the length of the bottom taper may be recessed into the material thickness of the base plate at least 75 percent of the material thickness of the base plate. In still another example, the raised section may be recessed into the material thickness of the base plate at least 75 percent of the material thickness of the base plate. The length of the bottom taper is illustrated as $L_{142}$ of FIGS. 4-4*a* and may be described as extending in a direction from the respective end of the striker pin to the central section of the striker pin.

To further reduce grain deformation, the top taper may also provide a moderate transition at the raised section of the striker pin, such as those previously described with respect to the bottom taper. In other examples, the top and bottom tapers may have a proportional relationship. By example, the length of the bottom taper may be less than the length of the respective top taper. In another example, the bottom taper may have a length less than a length of the top taper. The length of the top taper is illustrated as $L_{144}$ of FIGS. **4-4*a*** and may be described as extending in a direction from the respective end of the striker pin to the central section of the striker pin.

A method for making a striker plate of the present disclosure is also provided herein. In one example, the method for making the striker plate comprises inserting a striker pin into one or more apertures in the base plate. An end of the striker pin is inserted through an aperture in the base plate from a top side of the base plate in a direction of and through the bottom side of the base plate, relative the material thickness of the base plate. A raised section of the striker pin may comprise a bottom taper such that the bottom taper mates with the base plate within the respective aperture, from the top side of the base plate.

The method for making the strike plate may further comprise forming a button on the end, such as a terminal end, of the striker pin. The button is formed to the bottom side of the base plate wherein the base plate is secured between the raised section and the button. The button may be formed by heading, staking, orbital forming (e.g. orbital upset forming), cold working, hot working (e.g. captive hot forming), or the like. Orbital forming may be preferred as it provides less end force and assists in maintaining the bottom taper in position within the base plate when forming the button.

In some examples, the method for making the striker plate may further comprise heading the striker pin in a captive die to form the raised section. In a specific example, heading the striker pin in the captive die to form the raised section occurs prior to inserting the striker pin into the one or more apertures of the base plate. Once the raised section is formed, the method for forming the striker pin further comprises pressing the raised section into the respective aperture from the top side of the base plate. Additionally or alternatively, the base plate may be pressed into the raised section. When pressing, the bottom side taper deforms the respective aperture and is recessed into the respective aperture. The button may be formed after pressing the raised section into the respective aperture. Alternatively, the button may be formed in combination with pressing the raised section into the respective aperture. Further, the formation of the button and pressing the raised section into the respective aperture may alternate progressively.

Figure 9:
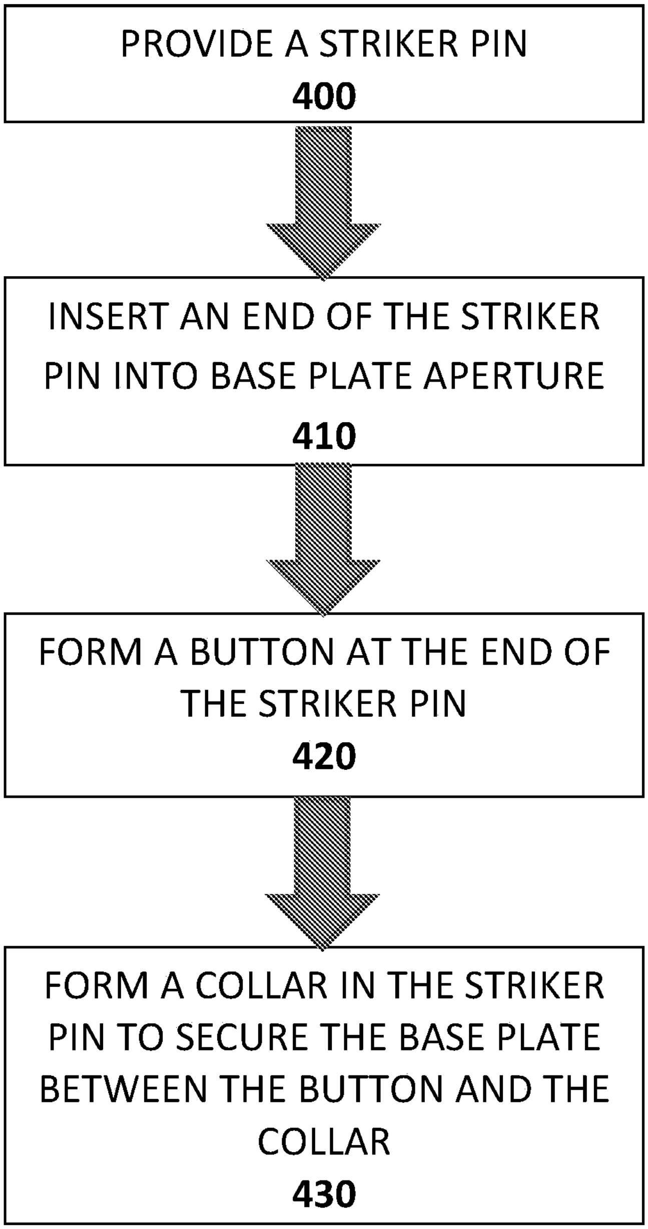
FIG. 9 (Prior Art)
FIG. 9 is a flow diagram of the prior art process for forming a door striker.

FIG. 9 is a prior art example of the process for forming a door striker having a collar. In FIG. 9, a door striker pin is provided 400. An end of the door striker pin is inserted into a base plate aperture 410. After inserting the door striker pin into the base plate aperture, a button is formed at the end of the striker pin 420 to keep the striker pin from being pulled out of the base plate. Further, a collar is formed in the striker pin to secure the base plate between the button and the collar 430.

Figure 10:
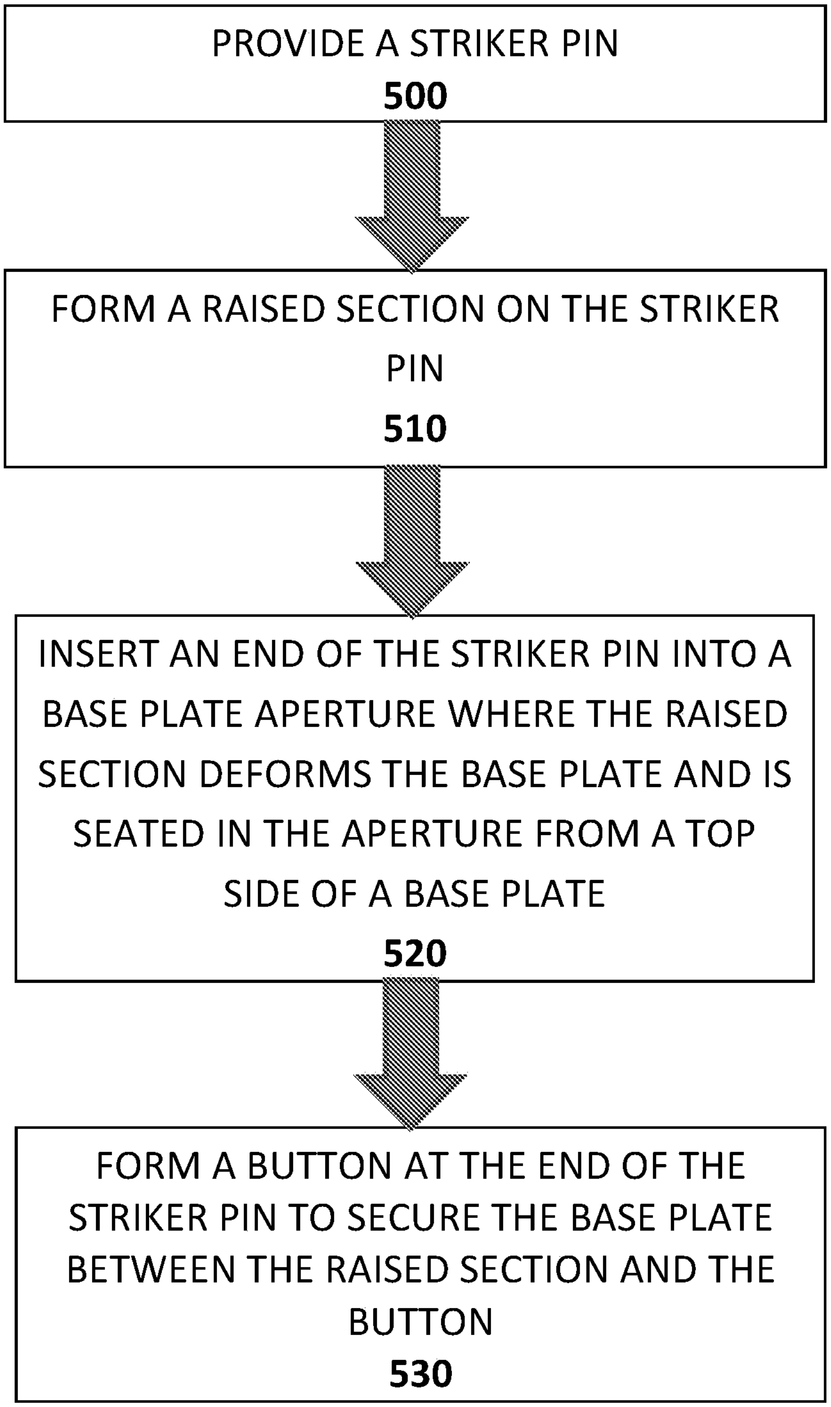
FIG. 10 is a flow diagram of an exemplary, non-limiting example of a process for forming a door striker according to one or more aspects of the present disclosure.

Comparatively, FIG. 10 is an example of the process for forming the door striker of the present disclosure. In FIG. 10 a door striker pin is provided. A raised section is formed on the striker pin 510. After forming the raised section, an end of the striker pin is inserted into a base plate aperture where the raised section deforms the base plate and is seated in the aperture from a top side of the base plate 520. After seating the striker pin into the aperture, a button is formed at the end of the striker pin to secure the base plate between the raised section and the button 530.

Prior art door strikers having collars were comparatively tested with door strikers of the present disclosure. The door strikers were of the same material, size, and shape. The tests illustrated the door striker of the present disclosure exhibited greater strength in each test. Specifically, the door striker having collars were found to have failed under oblique angle loads of up to less than half the loads in comparison the oblique angle loads applied to the door striker assembly of the present disclosure.

Table 1, below, illustrates test results for a door striker assembly of the present disclosure, tested to failure under a 45 degree angle pull test. In each of these tests, the striker pin was a SAE 4037 wire alloy and the base plate is SAE J1392 070 XLK steel. It is appreciated the door striker of the present disclosure may be made of any metal or material.

TABLE 1

45 Degree Angle Pull Test - Present Disclosure - (test performed Mar. 13, 2019)

| Results | Tensile Strength (lbs) | Tensile Strength (N) | Tensile Strength (KN) |
|---|---|---|---|
| Test 1 (Test No. 1190) | 7,017.14 | 31,212.24 | 31.21 |
| Test 2 (Test No. 1191) | 7,118.33 | 31,662.35 | 31.66 |
| Test 3 (Test No. 1192) | 6,584.90 | 29,289.63 | 29.29 |
| Test 4 (Test No. 1193) | 6,850.64 | 30,471.66 | 30.47 |
| Mean | 6,892.75 | 30,658.97 | 30.66 |
| Median | 6,850.64 | 30,471.66 | 30.47 |
| Std Dev | 233.02 | 1,036.50 | 1.04 |
| Maximum | 7,118.33 | 31,662.35 | 31.66 |
| Minimum | 6,584.90 | 29,289.63 | 29.29 |
| Range | 533.43 | 2,372.71 | 2.37 |

Table 2, below, illustrates test results for a door striker assembly of the prior art, tested to failure under a 45 degree angle pull test. For these tests, the striker pin of the prior art configuration was also a SAE 4037 wire alloy and the base plate is SAE J1392 070 XLK steel.

TABLE 2

45 Degree Pull Angle Test - Prior Art Assembly - (test performed Mar. 13, 2019)

| Results | Tensile Strength (lbs) | Tensile Strength (N) | Tensile Strength (KN) |
|---|---|---|---|
| Test 1 (Test No. 1186) | 4,422.77 | 19,672.49 | 19.67 |
| Test 2 (Test No. 1187) | 4,816.46 | 21,423.62 | 21.42 |
| Test 3 (Test No. 1188) | 4,324.15 | 19,233.82 | 19.23 |
| Test 4 (Test No. 1189) | 5,225.40 | 23,242.57 | 23.24 |
| Mean | 4,697.20 | 20.893.12 | 20.89 |
| Median | 4,422.77 | 19,672.49 | 19.67 |
| Std Dev | 411.38 | 1,829.80 | 1.83 |
| Maximum | 5,225.40 | 23,242.57 | 23.24 |
| Minimum | 4,324.15 | 19,233.82 | 19.23 |
| Range | 901.25 | 4,008.75 | 4.01 |

As illustrated by a comparison of Table 1 and Table 2, the assemblies of the present disclosure door striker consistently provided a significant improvement over the assemblies of the prior art door striker tested to failure at a 45 degree pull test.

Table 3, below, illustrates test results for a door striker assembly of the present disclosure, tested to failure under a 70 degree angle pull test. In each of these tests, the striker pin was a SAE 4037 wire alloy and the base plate is SAE J1392 070 XLK steel. It is appreciated the door striker of the present disclosure may be made of any metal or material.

TABLE 3

| 70 Degree Angle Pull Test - Present Disclosure - (test performed Mar. 12, 2019) | | | |
|---|---|---|---|
| Results | Tensile Strength (lbs) | Tensile Strength (N) | Tensile Strength (KN) |
| Test 1 (Test No. 1178) | 7,311.89 | 32,523.27 | 32.53 |
| Test 2 (Test No. 1179) | 6,523.65 | 29,017.17 | 29.02 |
| Test 3 (Test No. 1180) | 7,269.53 | 32,334.88 | 32.33 |
| Test 4 (Test No. 1181) | 6,904.84 | 30,712.73 | 30.71 |
| Mean | 7,002.48 | 31,147.01 | 31.15 |
| Median | 6,904.84 | 30,712.73 | 30.71 |
| Std Dev | 367.82 | 1,636.04 | 1.64 |
| Maximum | 7,311.89 | 32,523.27 | 32.52 |
| Minimum | 6,523.65 | 29,017.17 | 29.02 |
| Range | 788.24 | 3,506.10 | 3.51 |

Table 4, below, illustrates test results for a door striker assembly of the prior art, tested to failure under a 70 degree angle pull test. For these tests, the striker pin of the prior art configuration was also a SAE 4037 wire alloy and the base plate is SAE J1392 070 XLK steel.

TABLE 4

| 70 Degree Angle Pull Test - Prior Art Assembly - (test performed Mar. 12, 2019) | | | |
|---|---|---|---|
| Results | Tensile Strength (lbs) | Tensile Strength (N) | Tensile Strength (KN) |
| Test 1 (Test No. 1182) | 2,234.58 | 9,939.43 | 9.94 |
| Test 2 (Test No. 1183) | 2,395.47 | 10,655.03 | 10.66 |
| Test 3 (Test No. 1184) | 2,349.84 | 10,452.10 | 10.45 |
| Test 4 (Test No. 1185) | 2,313.94 | 10,292.38 | 10.29 |
| Mean | 2,323.46 | 10,334.74 | 10.33 |
| Median | 2,313.94 | 10,292.38 | 10.29 |
| Std Dev | 68 | 302.45 | 0.30 |
| Maximum | 2,395.47 | 10,655.03 | 10.66 |
| Minimum | 2,234.58 | 9,939.43 | 9.94 |
| Range | 160.88 | 715.60 | 0.72 |

As illustrated by a comparison of Table 3 and Table 4, the strength of the assemblies of the present disclosure door striker provided an improvement of more than double the load of the assemblies of the prior art door striker tested to failure at a 70 degree angle pull test. The above comparative test results, produced in Tables 1-4, illustrate the ability of the present disclosure to maintain high loads without breaking at the stress risers created by the prior art configuration.

Additional test results for a door striker assembly of the present disclosure are provided below. These additional tests, tested to failure at a 45 degree angle pull test, a 70 degree angle pull test, a longitudinal pull test, and a transverse pull test, are illustrated in Tables 5-8, below. In each of these tests, the striker pin was a SAE 4037 wire alloy and the base plate is SAE J1392 070 XLK steel. It is appreciated the door striker of the present disclosure may be made of any metal or material.

TABLE 5

| 45 Degree Angle Pull Test - Present Disclosure - (test performed Feb. 4, 2019) | | | |
|---|---|---|---|
| Results | Tensile Strength (lbs) | Tensile Strength (N) | Tensile Strength (KN) |
| Test 1 (Test No. 969) | 6,862.68 | 30,525.22 | 30.53 |
| Test 2 (Test No. 970) | 7,245.37 | 32,227.42 | 32.23 |
| Test 3 (Test No. 971) | 6,212.42 | 27,632.83 | 27.63 |
| Test 4 (Test No. 972) | 5,504.95 | 24,486.00 | 24.49 |
| Mean | 6,456.36 | 28,717.87 | 28.72 |
| Median | 6,212.42 | 27,632.83 | 27.63 |
| Std Dev | 764.27 | 3,399.48 | 3.4 |
| Maximum | 7,245.37 | 32,227.42 | 32.23 |
| Minimum | 5,504.95 | 24,486.00 | 24.49 |
| Range | 1,740.43 | 7,741.42 | 7.74 |

TABLE 6

| 70 Degree Angle Pull Test - Present Disclosure - (test performed Feb. 1, 2019) | | | |
|---|---|---|---|
| Results | Tensile Strength (lbs) | Tensile Strength (N) | Tensile Strength (KN) |
| Test 1 (Test No. 870) | 5,648.39 | 25,124.04 | 25.12 |
| Test 2 (Test No. 871) | 5,979.98 | 26,598.93 | 26.60 |
| Test 3 (Test No. 872) | 5,670.30 | 25.221.49 | 25.22 |
| Test 4 (Test No. 873) | 5,721.74 | 25,450.28 | 25.45 |
| Mean | 5,755.10 | 25,598.69 | 25.60 |
| Median | 5,670.30 | 25,221.49 | 25.22 |
| Std Dev | 153.04 | 680.70 | 0.68 |
| Maximum | 5,979.98 | 26,598.93 | 26.60 |
| Minimum | 5,648.39 | 25,124.04 | 25.12 |
| Range | 331.58 | 1,474.89 | 1.47 |

TABLE 7

| Longitudinal Pull Test - Present Disclosure - (test performed Feb. 4, 2019) | | | |
|---|---|---|---|
| Results | Tensile Strength (lbs) | Tensile Strength (N) | Tensile Strength (KN) |
| Test 1 (Test No. 962) | 7,682.93 | 34,173.67 | 34.17 |
| Test 2 (Test No. 963) | 7,608.97 | 33,844.71 | 33.84 |
| Test 3 (Test No. 968) | 8,432.52 | 37,507.86 | 37.51 |
| Mean | 7,908.14 | 35,175.41 | 35.18 |
| Median | 7,682.93 | 34,173.67 | 34.17 |
| Std Dev | 455.63 | 2,026.64 | 2.03 |
| Maximum | 8,432.52 | 37,507.86 | 37.51 |
| Minimum | 7,608.97 | 33,844.71 | 33.84 |
| Range | 823.55 | 3,663.14 | 3.66 |

TABLE 8

| Transverse Pull Test - Present Disclosure - (test performed Feb. 4, 2019) | | | |
|---|---|---|---|
| Results | Tensile Strength (lbs) | Tensile Strength (N) | Tensile Strength (KN) |
| Test 1 (Test No. 964) | 5,322.27 | 23,673.46 | 23.67 |
| Test 2 (Test No. 965) | 5,972.41 | 26,565.29 | 26.57 |
| Test 3 (Test No. 966) | 5,475.45 | 24,354.82 | 24.35 |
| Test 4 (Test No. 967) | 5,912.60 | 26,299.22 | 26.30 |
| Mean | 5,670.68 | 25,223.20 | 25.22 |
| Median | 5,475.45 | 24,354.82 | 24.35 |
| Std Dev | 320.97 | 1,427.68 | 1.43 |
| Maximum | 5,972.41 | 26,565.29 | 26.57 |

TABLE 8-continued

Transverse Pull Test - Present Disclosure - (test performed Feb. 4, 2019)

| Results | Tensile Strength (lbs) | Tensile Strength (N) | Tensile Strength (KN) |
|---|---|---|---|
| Minimum | 5,322.27 | 23,673.46 | 23.67 |
| Range | 650.14 | 2,891.84 | 2.89 |

Illustrative examples have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A door striker, comprising:

a striker pin comprising a leg, the leg comprising a leg taper; and a base plate comprising an aperture through which the leg extends;

wherein the aperture comprises an aperture taper corresponding to the leg taper as a result of the leg taper having been pressed into the aperture to thereby deform the base plate.

2. The door striker of claim 1, wherein the striker pin further comprises an additional leg comprising an additional leg taper;

wherein the base plate comprises an additional aperture through which the additional leg extends; and wherein the additional aperture comprises an additional aperture taper corresponding to the additional leg taper as a result of the additional leg taper having been pressed into the additional aperture to thereby deform the base plate.

3. The door striker of claim 1, wherein the striker pin further comprises a button formed on an end of the leg such that a portion of the base plate is captured between the button and the leg taper.

4. The door striker of claim 1, wherein the leg of the striker pin further comprises an enlarged section adjacent the leg taper; and wherein a diameter of the leg decreases from the enlarged section along the leg taper.

5. The door striker of claim 1, wherein the leg of the striker pin further comprises an enlarged section adjacent the leg taper; and wherein a grain deformation of the leg at the enlarged section comprises a maximum gradient of 15 degrees or less.

6. The door striker of claim 1, wherein a hardness of the base plate is less than a hardness of the striker pin as measured by the Rockwell hardness test.

7. The door striker of claim 1, wherein the leg taper comprises a rectilinear profile.

8. The door striker of claim 7, wherein the rectilinear profile provides the leg taper with a taper angle of 15° or less.

9. The door striker of claim 1, wherein a length the leg taper is greater than or equal to 75 percent of a thickness of the base plate.

10. The door striker of claim 1, wherein a depth of the aperture taper within the base plate is at least 75 percent a thickness of the base plate.

11. The door striker of claim 1, wherein the leg further comprises a top taper and an enlarged section connecting the top taper and the leg taper; and wherein a length of the leg taper is less than a length of the top taper.

12. The door striker of claim 1, wherein the leg taper is frustoconical.

13. The door striker of claim 1, wherein the aperture has a circular cross-section.

14. A method of forming a door striker, the method comprising:

processing a striker pin to thereby form a raised section including a bottom side taper;

pressing the bottom side taper into an aperture in a base plate, thereby deforming the base plate such that the aperture conforms to the bottom side taper; and forming a button on an end of the striker pin to thereby capture a portion of the base plate between the button and the bottom side taper.

15. The method of claim 14, wherein forming the button comprises heading the striker pin.

16. The method of claim 14, wherein processing the striker pin comprises heading the striker pin.

17. The method of claim 16, wherein heading the striker pin comprises heading the striker pin in a captive die to thereby form the raised section.

18. The method of claim 14, wherein a hardness of the base plate is less than a hardness of the striker pin as measured by the Rockwell hardness test.

19. The method of claim 14, wherein processing the striker pin comprises forming the bottom side taper with a circular cross-section.

20. The method of claim 14, wherein pressing the bottom side taper into the aperture comprises pressing the bottom side taper into the aperture until a depth of the aperture taper within the base plate is at least 75 percent a thickness of the base plate.

* * * * *